United States Patent Office 3,705,865
Patented Dec. 12, 1972

---

3,705,865
THERMOSTABLE MOULDING MATERIAL BASED ON VINYL CHLORIDE OR VINYLIDENE CHLORIDE POLYMERS
Joachim Kandler and Franz-Josef Dany, Lechenich, Klaus Komorniczyk, Turnich, and Peter Munch, Hurth-Burbach, Germany, assignors to Knapsack Aktiengesellschaft, Knapsack, near Cologne, Germany
No Drawing. Filed Sept. 10, 1970, Ser. No. 71,212
Claims priority, application Germany, Oct. 18, 1969, P 19 52 624.0
Int. Cl. C08f 45/62
U.S. Cl. 260—23 XA          2 Claims

ABSTRACT OF THE DISCLOSURE

Stabilization of moulding material based on vinyl chloride or vinylidene chloride polymers or copolymers, against the action of heat and light by means of lead compounds. The moulding material is more particularly stabilized with the use of a stabilizer mixture comprising a lead-dialkyl-dithiophosphate, of which the alkyl radicals contain between 1 and 18 carbon atoms, and one or more conventional thermostabilizers for vinyl chloride or vinylidene chloride polymers or copolymers.

---

The present invention provides moulding material, which is based on vinyl chloride or vinylidene chloride polymers or copolymers containing lead compounds, and is stabilized against the action of heat and light.

Vinyl chloride or vinylidene chloride polymers or copolymers having no stabilizer therein are known to be unstable under the action of heat or light. As a result of their thermoplastic properties, they are, however, processed exclusively at high temperatures and made into moulding material or finished products. This makes it necessary for them to be guarded against thermal degradation by the addition of stabilizers. The thermal degradation is initiated by dehydrochlorination of the polymer, which first assume a yellow to brown coloration and then undergoes complete breakdown to a stage at which the polymer can no longer be processed. In order to obviate this degradation, thermostabilizers are required to be added to vinyl chloride or vinylidene chloride polymers or copolymers, as well as to post-chlorinated polyvinyl chloride. Soft and hard polyvinyl chlorides are worked at a temperature of between 150 and 190° C., for example. In the absence of stabilizers therein, the thermostability of polyvinyl chloride is found to so decrease in this range of processing temperatures that the finished products are subject to chemical and physical changes.

Most of the stabilizers used heretofore are concerned with inorganic or organic compounds of the metals calcium, zinc, tin, cadmium, barium and lead. Their reactivity enables the hydrogen chloride which is evolved by dehydrochlorination to be captured and the chain dehydrochlorination to be blocked.

German Pat. 1,160,177 describes stabilized moulding material based on vinyl chloride polymers or copolymers having a homo- or heteropolycondensate of monoalkylstannonic acids or monoalkylthiostannonic acids as a thermostabilizer therein. The use of organotin compounds as stabilizers is generally handicapped by their price which is too high to be commercially attractive. In addition thereto, most of the organotin compounds are volatile substances sensitive to water, or they fail to be miscible uniformly enough with the resin to be stabilized, which is a further disadvantage. Attempts have therefore been made with the object of using further metal compounds for the above purpose, and barium-cadmium laurate, for example, as well as certain lead compounds have proved suitable for this. As described in "Chemie-Lexikon" by H. Römpp, 5th edition, the useful lead compounds include, for example, a basic lead-silicate-sulfate complex, marketed under the trademark "Tribase," and a dibasic lead phosphite, marketed under the trademark "Dyphos." Lead stearate commercially available under the designation "Pb51A/S1" may also be used as a stabilizer.

It has now been found that the thermostability of vinyl chloride or vinylidene chloride polymers or copolymers stabilized by means of conventional stabilizers can be considerably improved by incorporating with these polymers an additional lead-dialkyl-dithiophosphate stabilizer.

The present invention thus relates to the use of lead compounds for the stabilization of moulding material based on vinyl chloride or vinylidene chloride polymers or copolymers against the action of heat and light, and comprises effecting the stabilization by means of a mixture comprising a lead-dialkyl-dithiophosphate, of which the alkyl radicals contain between 1 and 18 carbon atoms, and one or more conventional thermostabilizers for vinyl chloride or vinylidene chloride polymers or copolymers.

The mixture of conventional stabilizers and the lead-dialkyl-dithiophosphate stabilizer should preferably contain the latter in a quantitative proportion of between about 0.5 and 50.0 weight percent, and the stabilizer mixture of lead-dialkyl-dithiophosphate and conventional stabilizer should preferably be introduced into the moulding material at a rate of at least about 0.5 weight percent, more preferably at a rate of between about 0.5 and 10.0 weight percent.

The lead-dialkyl-dithiophosphates having from 1 to 18 carbon atoms in the alkyl radicals include as particularly useful representatives lead-dimethyl-dithiophosphate, lead-diisoamyl-dithiophosphate, lead - didecyl-dithiophosphate and lead-distearyl-dithiophosphate.

Conventional stabilizers which may be used within the scope of the present invention include, for example, barium-cadmium laurate, dibasic lead phosphite, a basic lead silicate-sulfate complex or lead stearate. These stabilizers are commercially available under the trademarks mentioned hereinabove.

The moulding materials to be stabilized in accordance with the present invention include vinyl chloride or vinylidene chloride polymers as well as copolymers of these compounds with vinyl acetate, for example.

The moulding materials of the present invention, which are based on vinyl chloride or vinylidene chloride polymers or copolymers containing lead compounds, and are stabilized by means of a stabilized mixture comprising a lead-dialkyl-dithiophosphate, whose alkyl radicals contain between 1 and 18 carbon atoms, and one or more conventional thermostabilizers for vinyl chloride or vinylidene chloride polymers or copolymers, have been found to possess a better thermostability than corresponding moulding materials stabilized in conventional fashion. This is demonstrated by the fact that the period during which the moulding material can be processed at high temperatures until degradation phenomena commerce to appear is more than doubled, conditional upon the selection of the quantitative ratio for the components in the stabilizer mixture.

With respect to the stabilizer mixture used in accordance with the present invention, it is interesting to state that the individual components of the mixture in combination with the chlorine-containing polymers do per se produce a stabilizing effect against the action of heat and light; for the same stabilizer concentration, the single components are, however, found to produce an effect substantially weaker than that which is produced by the use of the stabilizer mixture of the present invention. In other words, the lead-dialkyl-dithiophosphates can be said to have synergistic properties which become active in combination with conventional stabilizers for vinyl chloride polymers.

It is convenient for the thermostability of the moulding material of the present invention to be determined using a device comprising two electrically heatable rollers, which are spaced apart from one another and rotate in opposing directions, at a speed of 11 r.p.m., for example. The moulding material to be tested, for example, a mixture comprising polyvinyl chloride powder, plasticizer and stabilizer, is fed to the rollers preheated to processing temperature, while leaving a narrow gap therebetween, or is delivered to the said gap and worked into a specimen sheet while the gap between the rollers is gradually increased. The roller gap is required to be selected so as to enable the feed material to be readily passed therethrough. At intervals of 5 minutes after delivery of the moulding material to the rollers, the rotating sheet is cut into specimen tapes with the dimensions of 40 x 80 mm. After cooling, the tapes are examined for changes in coloration or structure, by visual inspection. The material commences degradation when the sheet is found to adhere to the rollers. From that time on, test specimens are taken at intervals of 2 to 3 minutes and inspected for changes in their outer appearance. An index of the thermostability of the moulding material tested is the time in minutes from the delivery of the moulding material to the roller gap until black coloration of the test tape, at a given temperature and speed of the rollers.

EXAMPLE 1

The thermostability of a polyvinyl chloride produced in suspension and having a K-value of 70 was tested in a series of tests with the use of the roller device described hereinabove, and in the presence of a stabilizer mixture consisting of barium-cadmium laurate and lead-diisoamyl-dithiophosphate. To this effect, 140 grams of the powdery polyvinyl chloride was first blended with 60 grams diisooctylphthalate and 1.5 weight percent, based on the quantity of polyvinyl chloride, of a stabilizer mixture of barium-cadmium laurate and lead-diisoamyl-dithiophosphate, was then added to the blend so made. The temperature of the rollers was 175° C., which rotated at a speed of 11 r.p.m. The various stabilizer mixtures tested contained between 0.1 and 0.5 weight percent, based on polyvinyl chloride, of lead-diisoamyl-dithiophasphate. The results obtained in the series of tests made are indicated in the following Table 1, in which column A indicates the quantitative proportion of barium-cadmium laurate in the moulding material, in weight percent, based on the quantity of polyvinyl chloride used;

column B indicates the quantitative proportion of lead-diisoamyl-dithiophosphate in the moulding material, in weight percent, based on the quantity of polyvinyl chloride used, and column C indicates the thermostability of the moulding material, in minutes.

TABLE 1

| A | B | C |
|---|---|---|
| Weight percent | Weight percent | Minutes |
| 1.5 | ---------- | 68 |
| 1.4 | 0.1 | 105 |
| 1.38 | 0.12 | 130 |
| 1.345 | 0.155 | 152 |
| 1.32 | 0.18 | 155 |
| 1.3 | 0.2 | 154 |
| 1.245 | 0.255 | 137 |
| 1.0 | 0.5 | 70 |
|  | 1.5 | 75 |

As can be seen from Table 1, it was possible by the use of a stabilizer concentration of 1.32 weight percent barium-cadmium laurate and 0.18 weight percent lead-diisoamyl-dithiophosphate to produce an optimum stabilization effect of 155 minutes. By using merely one stabilizer component for the stabilization of polyvinyl chloride, it was even impossible to approach that value. The stabilizer mixture which produced the optimum effect contained the two stabilizer components in a total concentration of 1.5 weight percent, based on the polyvinyl chloride quantity; the individual stabilizer components were used in a quantitative ratio of 88 weight percent barium-cadmium laurate and 12 weight percent lead-diisoamyl-dithiophosphate.

EXAMPLE 2

The moulding material used in Example 1 was tested in a series of tests to determine its thermostability as a function of the concentration of the stabilizer mixture comprising barium-cadmium laurate and lead-diisoamyl-dithiophosphate. The two stabilizer components were used in the optimum mixing ratio of 88:12 weight percent, described in Example 1. The temperature of the rollers was 175° C. The test results are indicated in Table 2 below, in which columns A and C have the meanings given above, and column D indicates the various concentrations of the stabilizer mixture within the above optimum mixing ratio.

TABLE 2

| A | C | D | C |
|---|---|---|---|
| Weight percent | Minutes | Weight percent | Minutes |
| 1.5 | 68 | 1.5 | 155 |
| 1.4 | 60 | 1.4 | 135 |
| 1.25 | 55 | 1.25 | 120 |
| 1.0 | 47 | 1.0 | 97 |
| 0.9 | 42 | 0.9 | 90 |
|  |  | 0.65 | 68 |
|  |  | 0.75 | 78 |
|  |  | 0.5 | 42 |

As shown in Table 2, merely 0.65 weight percent of the stabilizer mixture was required to be used to produce a thermostability of 68 minutes, for example, whereas 1.5 weight percent, i.e. more than double quantity of stabilizer was necessary to produce the same effect, with the use of merely barium-cadmium laurate.

EXAMPLE 3

The effect of the roller temperature on the thermostability of stabilized polyvinylchloride was tested in a further series of tests, which were carried out under the conditions of Example 1. The moulding materials tested at different temperatures were comprised of moulding material stabilized by means of 1.5 weight percent barium-cadmium laurate, and of moulding material stabilized with 1.5 weight percent of the stabilizer mixture described in Example 2, in the optimum mixing ratio. The results obtained are indicated in Table 3 below in which column E indicates the temperature of the rollers, in centigrade degrees, column F indicates the thermostability of moulding material stabilized by means of barium-cadmium laurate, in minutes, and column G indicates the thermostability of moulding material stabilized by means of the stabilizer mixture, in minutes.

TABLE 3

| E | F | G |
|---|---|---|
| ° C. | Minutes | Minutes |
| 175 | 68 | 155 |
| 180 | 59 | 115 |
| 185 | 50 | 89 |
| 190 | 42 | 66 |

As shown in Table 3, the stabilizer mixture was found once again to distinguish favorably over the single stabilizer, even under the action of different temperatures on the PVC-moulding material.

EXAMPLE 4

A series of tests were carried out in a manner analogous to that described in Example 1, save that the vinyl-chloride polymer was stabilized by means of a stabilizer mixture comprising dibasic lead phosphite marketed under the trademark Dyphos (a produce of Metallgesellschaft AG., Frankfurt) and lead-diisoamyl-dithiophosphate. The results obtained are indicated in column 4 below, in which column H indicates the concentration of dibasic lead phosphite in the polymer, based on the quantity of polyvinyl chloride used (weight percent),
column J indicates the concentration of lead-diisoamyl-dithiophosphate in the polymer, based on the quantity of polyvinyl chloride used (weight percent), and
column K indicates the thermostability of the polymer, in minutes at a temperature of the rollers of 175° C.

TABLE 4

| H Weight percent | J Weight percent | K Minutes |
|---|---|---|
| 3.00 | ---------- | 15 |
| 3.00 | 2.00 | 22 |
| 3.00 | 1.50 | 23 |
| 3.00 | 1.00 | 38 |
| 3.00 | 0.50 | 55 |
| 3.00 | 0.20 | 90 |
| 3.00 | 0.15 | 93 |
| 3.00 | 0.10 | 90 |
| 3.00 | 0.05 | 70 |

EXAMPLE 5

A series of tests were carried out in a manner analogous to that described in Example 1, save that the vinyl chloride polymer was stabilized by means of a stabilizer mixture comprising a basic lead silicate-sulfate complex marketed under the trademark Tribase and lead-diisoamyl-dithiophosphate. The results obtained are indicated in Table 5 below, in which columns J and K have the meanings given in Example 4 and column L indicates the concentration of the lead silicate-sulfate complex in the moulding material, in weight percent.

TABLE 5

| L Weight percent | J Weight percent | K Minutes |
|---|---|---|
| 3.00 | ---------- | 13 |
| 3.00 | 2.00 | 23 |
| 3.00 | 1.50 | 29 |
| 3.00 | 1.00 | 31 |
| 3.00 | 0.50 | 34 |
| 3.00 | 0.20 | 44 |
| 3.00 | 0.10 | 65 |
| 3.00 | 0.05 | 55 |

EXAMPLE 6

A series of tests were carried out in a manner analogous to that described in Example 1, save that the vinyl chloride polymer was stabilized by means of a stabilizer mixture comprising Tribase, Dyphos and lead-diisoamyl-dithiophosphate. The results obtained are indicated in Table 6 below, in which columns H, J, K and L have the meanings given in Examples 4 and 5, respectively.

TABLE 6

| L Weight percent | H Weight percent | J Weight percent | K Minutes |
|---|---|---|---|
| 1.50 | 1.50 | ---------- | 13 |
| 1.50 | 1.50 | 2.00 | 33 |
| 1.50 | 1.50 | 1.50 | 33 |
| 1.50 | 1.50 | 1.00 | 35 |
| 1.50 | 1.50 | 0.50 | 45 |
| 1.50 | 1.50 | 0.20 | 60 |
| 1.50 | 1.50 | 0.10 | 70 |
| 1.50 | 1.50 | 0.05 | 75 |

EXAMPLE 7

A series of tests were carried out in a manner analogous to that described in Example 1, save that the vinyl chloride polymer was stabilized by means of a stabilizer mixture comprising lead stearate marketed under the designation Pb51A/S1 and lead-diisoamyl-phosphate. The results obtained are indicated in Table 7 below, in which columns J and K have the meanings given in Example 4, and column M indicates the concentration of lead stearate in the moulding material, in weight percent.

TABLE 7

| M Weight percent | J Weight percent | K Minutes |
|---|---|---|
| 0.50 | ---------- | 40 |
| 1.00 | ---------- | 73 |
| 1.50 | ---------- | 120 |
| 2.00 | ---------- | 122 |
| | 0.50 | 40 |
| | 1.00 | 67 |
| | 1.50 | 75 |
| | 2.00 | 90 |
| 0.50 | 0.50 | 100 |
| 0.70 | 0.30 | 125 |
| 0.80 | 0.20 | 115 |
| 0.90 | 0.10 | 130 |
| 0.93 | 0.07 | 135 |
| 0.95 | 0.05 | 145 |
| 0.98 | 0.02 | 115 |

EXAMPLE 8

A series of tests were carried out in a manner analogous to that described in Example 1, save that the vinyl chloride polymer was stabilized by means of a stabilizer mixture comprising lead stearate marketed under the designation Pb51A/S1 and lead-didecyl-dithiophosphate. The results obtained are indicated in column 8 below, in which columns M and K have the meanings given in Examples 7 and 4, respectively, and column N indicates the concentration of lead-didecyl-dithiophosphate in the moulding material, in weight percent.

TABLE 8

| M Weight percent | N Weight percent | K Minutes |
|---|---|---|
| | 0.50 | 50 |
| | 1.00 | 90 |
| | 1.50 | 105 |
| 0.50 | 0.50 | 90 |
| 0.85 | 0.15 | 109 |
| 0.90 | 0.10 | 128 |
| 0.93 | 0.07 | 115 |
| 0 95 | 0.05 | 105 |
| 0.97 | 0.03 | 91 |

EXAMPLE 9

A series of tests were carried out in a manner analogous to that described in Example 1, save that the vinyl chloride polymer was stabilized by means of a stabilizer mixture comprising lead stearate (Pb51A/S1) and lead-distearyl-dithiophosphate. The results obtained are indicated in the following Table 9, in which columns M and K have the meanings given in Examples 7 and 4, respectively, and column O indicates the concentration of lead-distearyl-dithiophosphate in the moulding material, in weight percent.

TABLE 9

| M Weight percent | O Weight percent | K Minutes |
|---|---|---|
| | 0.50 | 82 |
| | 1.00 | 84 |
| | 1.50 | 90 |
| 0.50 | 0.50 | 75 |
| 0.70 | 0.30 | 105 |
| 0.80 | 0.20 | 128 |
| 0.85 | 0.15 | 135 |
| 0.875 | 0.125 | 135 |
| 0.90 | 0.10 | 139 |
| 0.925 | 0.075 | 127 |
| 0.95 | 0.05 | 130 |

EXAMPLE 10

The stabilizing effect of a mixture comprising 0.9 weight percent barium-cadmium laurate and 0.1 weight percent lead-dimethyl-dithiophosphate was tested in a manner analogous to that described in Example 1, and the resulting thermostability values expressed in minutes were compared with the stability values obtained by the use of 1 weight percent lead-dimethyl-dithiophosphate and 1 weight percent barium-cadmium laurate, respectively, as the stabilizer. The stabilizer mixture was found to produce a thermostability of 95 minutes, whereas the individual stabilizers were found to produce a thermostability of 10 and 47 minutes, respectively.

What is claimed is:

1. Moulding material stabilized against the action of heat and light, based on vinyl chloride polymers, the said moulding material containing as stabilizer a mixture comprising barium-cadmium laurate and lead-diisoamyl-dithiophosphate, the amount of lead-diisoamyldithiophosphate in said stabilizer mixture being between about 0.5 and 50.0 percent by weight thereof, the amount of said stabilizer mixture being 1.5 percent by weight of said moulding material.

2. The moulding material as claimed in claim 1, wherein the amount of the lead-diisoamyl-dithiophosphate in said stabilizer mixture is 12 weight percent thereof.

References Cited
UNITED STATES PATENTS

| | | | |
|---|---|---|---|
| 2,739,122 | 3/1956 | Kennerly et al. | 260—45.75 |
| 2,906,731 | 9/1959 | Hill et al. | 260—45.75 |
| 2,786,044 | 3/1957 | Warner et al. | 260—45.75 |
| 3,413,264 | 11/1968 | Hechenkleikner et al. | 260—45.85 |
| 2,625,521 | 1/1953 | Fischer et al. | 260—45.75 |

OTHER REFERENCES

National Lead Company, XL Grade Stabilizers 1962–64, fly sheet.

DONALD E. CZAJA, Primary Examiner

V. P. HOKE, Assistant Examiner

U.S. Cl. X.R.

260—45.75 R